United States Patent
Hoenig et al.

(10) Patent No.: US 6,849,169 B1
(45) Date of Patent: Feb. 1, 2005

(54) ELECTRO-DIPCOATING BATHS WITH ADDITIVES PREVENTING THE FORMATION OF CRATERS IN THE BAKED COATING

(75) Inventors: Helmut Hoenig, Kumberg (AT); Georg Pampouchidis, Graz (AT); Gerald Hobisch, Graz (AT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/700,443

(22) PCT Filed: Apr. 30, 1999

(86) PCT No.: PCT/EP99/02947

§ 371 (c)(1),
(2), (4) Date: Nov. 27, 2002

(87) PCT Pub. No.: WO99/58616

PCT Pub. Date: Nov. 18, 1999

(30) Foreign Application Priority Data

May 8, 1998 (AT) ............................................. A 775/98

(51) Int. Cl.$^7$ ............................................... C25D 13/10
(52) U.S. Cl. ......................... 204/489; 204/500; 523/415
(58) Field of Search ................................ 204/489, 500, 204/501; 523/415

(56) References Cited

U.S. PATENT DOCUMENTS 5,415,750 A * 5/1995 Klein et al. ............... 204/181.7

FOREIGN PATENT DOCUMENTS

| EP | 0070550 | 1/1983 |
|---|---|---|
| JP | 61115974 | 6/1986 |

* cited by examiner

*Primary Examiner*—Kishor Mayekar
(74) *Attorney, Agent, or Firm*—Steven C. Benjamin

(57) ABSTRACT

Use of homopolymers or copolymers of 2-ethyl hexyl acrylate as an additive in aqueous cathodically depositable coatings to suppress the formation of surface defects in coating films, in which the proportion by mass of the comonomers in the monomer mixture used for the preparation of the copolymers does not exceed 35%.

14 Claims, No Drawings

ELECTRO-DIPCOATING BATHS WITH ADDITIVES PREVENTING THE FORMATION OF CRATERS IN THE BAKED COATING

This application is a 35 USC 371 National Stage filing of PCT/EP99/02947 on Apr. 30, 1999.

BACKGROUND OF THE INVENTION

The invention relates to additives for electro-dipcoating baths which prevent the formation of surface irregularities (craters) in the stoved coating film.

It is known that in the manufacture of motor cars, sheet-metal coils are used to manufacture body parts or whole bodies by punching and shaping, riveting and welding. Conventionally, the metal sheets or sheet-metal parts are oiled or provided for example with drawing greases, lubricants or cutting oils to ensue that transport proceeds without friction, that the punches and presses are treated gently and so on. The blank bodies are cleaned and degreased only once they reach the pre-treatment zone, and thereafter the blank bodies are phosphated and the first coating layer is conventionally applied by the process of cathodic electro-dipcoating.

During stoving of this first coating layer in the stoving ovens (driers), the drawing greases and oils enclosed in the folds and flanges heat up and are sprayed out as a result of the pressure that develops. As a result of the circulating air flow in the stoving ovens, the droplets of oil and grease are distributed on the first coating layer, which has not yet been cross-linked, and produce surface irregularities, so-called craters.

The object of the invention was therefore to develop a surface-active substance ("anti-cratering") which prevents the formation of craters and has no disadvantageous effects on the subsequent layers. These substances must be incompatible with the aqueous coating system, have low surface tension, spread out well on the (not cross-linked) coating surface, be easy to apply, and have no disadvantageous influence on the coating properties in the concentration used. Disadvantageous effects on subsequent layers are adhesion problems in the subsequently applied coatings, for example with plastics such as PVC, with adhesives, filler layers and refinishes. If for example silicone oils are added to the dipcoating bath, then although cratering is reduced the adhesion of the subsequent coating layers is impaired to the extent that satisfactory coating is not possible. The addition of certain resins to the bath liquid has also been recommended: in patent application JP-A-61-115974, an epoxy-amine adduct comprising an epoxy resin modified with dimeric fatty acids and a polyoxyalkylene polyamine is described. Although this does allow the tendency to cratering to be reduced, the adhesion of the subsequent layers is impaired. A further example of epoxy-amine adducts as an anti-cratering agent can be found in EP-A-0070550: although the adduct, comprising an epoxy resin and a polyoxyalkylene polyamine containing primary amino groups, reduces the tendency to cratering, it also has a disadvantageous effect on the adhesion of the subsequent coating layers.

Also described is the addition of homopolymers or copolymers of certain alkyl vinyl ethers to the dipcoating bath. In this case, the contents by mass of these polymers in the bath liquid are kept between 10 and 10000 ppm, preferably 150 to 500 ppm. It has been observed that when the content of polyalkyl vinyl ethers falls below the preferred range, craters are produced in considerable numbers, even without oils or greases being in the bath liquid. When the preferred range is exceeded, exudation occurs, in which the surface of the coating film is coated with a greasy layer. This also has a disruptive effect on the adhesion of the subsequent layers. It is therefore important to keep the content of this polymer within the preferred range. Because of the low quantity used and the difficulty of determining the proportion of this polymer in the bath liquid simply and quickly, the need arose to find an additive to suppress craters which has a broader range of application as regards its concentration in the bath and which enables the concentration in the bath liquid to be determined in a simple way.

DETAILED DESCRIPTION OF THE INVENTION

It has now been found that a homopolymer comprising 2-ethyl hexyl acrylate can advantageously be used as the anti-cratering agent. Particularly suitable are those homopolymers of 2-ethyl hexyl acrylate which, when the viscosity of diluted solutions of the polymer in chloroform as the solvent is measured, have a limiting viscosity number $J_g$ (limit value of the relative change in viscosity $J_v$ relative to concentration, with decreasing concentration and shear stress) of 1.5 cm$^3$/g to 12 cm$^3$/g.

The measured values for dynamic viscosity $\eta$ of the solution and $\eta_g$ of the solvent give the relative change or increase in viscosity $\eta_r - 1$ in accordance with $$\eta_r - 1 = \frac{\eta - \eta_s}{\eta_s}$$

From this, the relative change in viscosity $J_v$ relative to concentration (limiting viscosity function) is calculated in accordance with $$J_v = \frac{1}{\beta_i} \cdot \frac{\eta - \eta_s}{\eta_s}$$

where $\beta_i$ is the concentration by mass of the dissolved substance (mass $m_i$ of the substance divided by volume V of the solution). The limit value is derived from the above limiting viscosity number $J_g$ as $$J_s = \lim_{\beta_i \to 0} \frac{1}{\beta_i} \cdot \frac{\eta - \eta_s}{\eta_s}$$

The homopolymer according to the invention should advantageously have a limiting viscosity number of 1.5 to 12, particularly advantageously 3.5 to 7 cm$^3$/g.

Copolymers of 2-ethyl hexyl acrylate, with comonomers selected from alkyl acrylates having 1 to 18, particularly preferably 1 to 6, carbon atoms in the alkyl radical and hydroxyalkyl acrylates having 2 to 6, particularly preferably 2 to 4, carbon atoms in the hydroxyalkyl radical may also be used according to the invention, provided the proportion by mass of comonomers in the monomer mixture does not exceed 35%, preferably 25%. In this case, mixtures of the comonomers mentioned can also be used, in which case the limitation on the proportion by mass applies to the total masses of the comonomers used. The alkyl or hydroxyalkyl radicals of the preferably used comonomers may be linear, branched or cyclic.

The homopolymers and copolymers of 2-ethyl hexyl acrylate according to the invention are produced by solution polymerisation or bulk polymerisation and are therefore free of emulsifiers. They should be dissolved in the conventional solvents, such as chloroform, tetrahydrofuran, toluene or acetone without residue.

The homopolymer or copolymer of 2-ethyl hexyl acrylate is insoluble in water and by itself is immiscible in water and non-emulsive in water, when preparing the binder for the cathodically applied electro-dip-coating it can be admixed with this binder before the dilution procedure with water and in this way converted to the aqueous phase. The homopolymer or copolymer of 2-ethyl hexyl acrylate can however also be mixed with emulsive water-miscible binders, e.g. paste resins, epoxy-amine adducts or wetting agents, and in this form admixed with the aqueous electro-dip-coating.

Preferably, the homopolymer or copolymer of 2-ethyl hexyl acrylate is used in a quantity such that its proportion by mass relative to the mass of the solid resin in the cathodic electrodeposition coating is approximately 0.5 to 5%, preferably 0.9 to 1.8%. Solid resin should be understood here as the resin proportion in the binder without other solids, such as catalyst residues, pigments (flow promoter) additives and fillers.

The cathodically depositable synthetic resins, which form a substantial constituent in electro-dipcoating baths, are preferably the conventional epoxy-amine adducts. They are preferably used together with blocked isocyanates. During stoving (heating) of the metal sheets with the deposited coating layer, these isocyanates split off the blocking agent if the stoving temperature reaches or the decomposition temperate of the adduct of isocyanate and blocking agent. The free isocyanate then reacts with the hydroxy or amino groups in the epoxy-amine adduct and cross-links this coating layer.

To prepare the epoxy-amine adducts, polyepoxides having at least two epoxy groups per molecule with primary or secondary amines or mixtures thereof or their salts or mixtures thereof are reacted in known manner.

In the examples below, as in the preceding text, all percentage figures are proportions by mass, unless otherwise stated. "Parts" are always parts by mass. Concentration figures given as percentages are proportions by mass of the dissolved substance in the solution. The specific epoxy group content SEG of a sample B is defined as the quotient of the quantity of substance of epoxy groups n(EP) in the mass $m_B$ of the substance concerned (reciprocal value of the so-called "EV value" or "epoxy equivalent weight"):

$$SEG = n(EP)/m_B$$

a conventional unit is for example mmol/kg.

The acid value is defined in DIN 53 402 as the quotient of that mass $m_{KOH}$ of potassium hydroxide required to neutralise a sample under investigation and the mass $m_B$ of this sample (mass of solid in the sample in the case of solutions or dispersions); their usual unit is "mg/g". The amine value is defined in DIN 53 176 as the quotient of that mass $m_{KOH}$ of potassium hydroxide which for neutralisation consumes exactly the same amount of acid as a sample under investigation and the mass $m_B$ of this sample (mass of solid in the sample in the case of solutions or dispersions); their usual unit is "mg/g".

EXAMPLE 1

Binder for Pigment Paste
a) Preparation of an Epoxy Resin Intermediate Product Modified with Polypropylene Glycol 258 parts of 2-ethyl hexyl amine (2 mol) were put in a suitable reaction vessel equipped with stirrer, thermometer and distillation equipment and were heated to 80° C. At 80 20 C., 380 parts of an aliphatic epoxy resin (based on polypropylene glycol, epoxy equivalent weight approximately 190 g/mol; SEG approximately 5260 mmol/kg) were added evenly over one hour, during which the temperature rose to 120° C. Reaction of the batch was continued for one hour at 120° C. Then 1175 parts of monoethylene glycol monobutyl ether and at 70° C. 1900 parts of an epoxy resin based on bisphenol A (epoxy equivalent weight approximately 475 g/mol, SEG approximately 2100 mmol/kg) were added and the batch was heated to 120° C. and reacted at this temperature for 1½ hours. The intermediate product had a proportion by mass of 11% of polyoxyalkylene structural units and a proportion by mass of 9% of alkyl radicals having more than 3 C atoms.

b) Preparation of the Paste Resin 204 parts of 3-dimethylamino-1-propylamine (2 mol) were added at 100° C. to the intermediate product obtained in a) and were reacted at 100° C. for 1 hour. After adding 314 parts of monoethylene glycol monobutyl ether and 66 parts of 91% paraformaldehyde (2 mol), approximately 36 parts of water of reaction were distilled off at approximately 140° C. under azeotropic distillation with methyl isobutyl ketone, as the entraining agent. Thereafter, the methyl isobutyl ketone was removed under vacuum and the composition was diluted with 774 parts of monoethylene glycol monobutyl ether to give a solid proportion by mass of 55%.

EXAMPLE 2

Preparation and Testing of a Pigment Paste from the Product According to Example 1

The resin prepared according to Example 1 was neutralised by adding 100 mmol of acetic acid per 100 g of the solid resin and was diluted with deionised water to a solid proportion by mass of 14%.

A pigment paste was prepared in a laboratory sand mill using the following formulation:

| | |
|---|---|
| 1428.5 parts | binder, 14% |
| 30 parts | carbon black pigment |
| 225 parts | aluminium silicate pigment |
| 840 parts | titanium dioxide |
| 105 parts | lead silicate pigment |
| 2628.5 parts | pigment paste, 53.3% |

EXAMPLE 3

Preparation of the Binder Dispersion

The binder for the binder dispersion used in the electro-dip-coating was prepared on the basis of modified epoxy resins, in a manner analogous to Example 1 of the Austrian patent AT-B 353 369:

3.1 Preparation of the Binder

A) Preparation of Component A 1000 g of an epoxy resin based on bisphenol A (epoxy equivalent weight approximately 500 g/mol; SEG approximately 2000 mmol/kg) were dissolved in 500 g of methyl isobutyl ketone (MIBK) in a reaction vessel equipped with stirrer, thermometer, dropping funnel and reflux condenser at 60 to 70° C., and then 0.2 g of hydroquinone and 168 g of methacrylic acid were added. The temperature was increased to 100 to 120° C. and the reaction was performed at this temperature until an acid value of below 3 mg/g was obtained. Then 650 g of BMI (70% solution in MIBK of a basic monoisocyanate, prepared from 1 mol of toluylene diisocyanate and 0.9 mol of dimethyl ethanolamine, molar mass=254 g/mol) were added to the reaction product at 60 to 70° C., and reaction was continued until virtually no more isocyanate could be detected.

B) Preparation of Component B 400 g of an epoxy resin based on bisphenol A (epoxy equivalent weight approximately 200 g/mol; SEG approximately 5000 mmol/kg) were dissolved in 172 g of MIBK in a reaction vessel equipped with stirrer, thermometer, dropping funnel and reflux condenser, and then 210 g of diethanolamine (2 mol) were added at 60 to 70° C. Once the evolution of heat was complete, the reaction was continued for a further hour at approximately 130° C. (reflux temperature). As a further step, reaction of the reaction product with 830 g of UMI (70% solution in MIBK of an unsaturated monoisocyanate, prepared from 1 mol of toluylene diisocyanate and 1 mol of hydroxyethyl methacrylate, molar mass=304 g/mol) was continued at 70 to 80° C. until virtually no more isocyanate could be detected.

3.2 Preparation of the Dispersion and Addition of the Anti-cratering Agent According to the Invention Components A and B in a mass ratio of 80 to 20 were thoroughly mixed at 70° C. with the addition of the anti-cratering agent comprising 0.5–2.0 g per 100 g of the solid resin, and neutralised using 30 mmol of formic acid per 100 g of the solid resin. Dispersions 3.2 a to 3.2 e were prepared, containing additions of 0; 0.5; 1.0; 1.5 and 2.0 g of a homopolymer of 2-ethyl hexyl acrylate (J=5.2 cm$^3$/g) per 100 g of solid resin. The solvent MIBK was largely distilled off under reduced pressure at 80° C. As a further step, the product was diluted with deionised water to approximately 45%, with vigorous stirring and decreasing temperature. At this concentration, dispersion was carried out vigorously for 2 hours with cooling and then the solid proportion by mass determined. Then the product was further diluted with deionised water to 35%.

EXAMPLE 4

Preparation of an Electro-dipcoating Composition

A bath material for the electro-dipcoating was prepared in accordance with the following formulation:

| | | |
|---|---|---|
| 1600 parts | binder dispersion according to Example 3 (3.2 a to 3.2 e), 35% | |
| 2872.5 parts | deionised water | |
| 527.5 parts | pigment paste, 53.3% according to Example 2 | |
| 5000 parts | coating | |

The coatings had a solid proportion by mass of 16.8% and a pH of 6.0 to 6.2. Zinc phosphated steel sheets were coated with these coatings under the following bath conditions to obtain layer thicknesses of approximately 23 to 25 μm:

| | |
|---|---|
| Bath temperature: | 28 to 30° C. |
| Coating tension: | 300 V |
| Coating time: | 2 minutes |

Drawing oils (®Anticorit RP 41078, ®Tizinol VZ 386, ®Tizinol VZ 292) were sprayed onto the coating layers which had been deposited but not yet stoved, with the aid of a brush. The metal sheets were then stoved for 15 minutes at 180° C.

Result

The metal sheets without anti ting agents according to the invention (3.2 a) displayed pronounced crater-type depressions which extended as far as the metal surface.

The metal sheets with anti-cratering agents according to the invention (3.2 b to 3.2 e) displayed only residual traces of oil drops on the coating film surface, but no depressions were visible in the coating film.

EXAMPLE 5

Preparation of the Pigment Paste Resin According to AT-B 394 372, Example 3

640 parts of an aliphatic epoxy resin (based on polypropylene glycol, EV value approximately 320 g/mol; SEG approximately 3125 mmol/kg), 800 parts of epoxy resin based on bisphenol A (EV value approximately 200 g/mol; SEG approximately 5000 mmol/kg), 456 parts (2 mol) of bisphenol A and 3 parts of triethylamine were added at 80° C. to 533 parts of ethylene glycol monobutyl ether ("BUGL") in a reaction vessel. The composition was heated to 130° C. and stirred for 2 hours. The product had a proportion by mass of polyoxyalkylene units of 28%.

204 parts of 3-dimethylamino-1-propylamine (2 mol) were added to this intermediate product at 180° C. After an hour at 100° C., 66 parts of 91% paraformaldehyde (2 mol) were added to the batch, and approximately 36 parts of water of reaction were removed at approximately 140° C. under azeotropic distillation with methyl isobutyl ketone as the entraining agent. Thereafter, the methyl isobutyl ketone was removed under reduced pressure, the composition was neutralised at approximately 80° C. with 192 parts of 30% acetic acid (36 mmol per 100 g of the solid resin) and the result was diluted with 1880 parts of completely demineralised water to give a solid proportion by mass of approximately 45%.

EXAMPLE 6

6.1 Preparation of the Binder Used in the Coatings According to EP-A 0 209 857, Example 1

220 parts of nonyl phenol (1 mol) were heated to 75° C. in a suitable reaction vessel with 130 parts of diethyl aminopropylamine (1 mol) and 100 parts of toluene, and 33 parts of 91% paraformaldehyde (1 mol) were then added to the batch with slight cooling. The temperature was increased slowly until a vigorous azeotropic distillation took place. After 21 parts of water of reaction had been separated off, the toluene was distilled off under reduced pressure, and the product was dissolved in 167 parts of diethylene glycol dimethyl ether.

304 parts (1.0 mol) of a toluylene diisocyanate half-blocked with 2-ethyl hexanol were added to the solution thus obtained at 30 to 40° C. with cooling, and the temperature was kept at 40° C. for approximately 1.5 hours until no more isocyanate could be detected. Then 475 parts of an epoxy resin based on bisphenol A (EV value approximately 475 g/mol; SEG approximately 2100 mmol/kg) were dissolved in 200 parts of propylene glycol monomethyl ether, and after the addition of 835 parts of the intermediate product prepared above were reacted together at 95 to 100° C. until no more epoxide could be detected. The solid proportion by mass was approximately 75%.

6.2 Preparation of the Binder Dispersion 2300 parts of completely dimineralised water and 32 parts of aqueous formic acid (5 mol/l) were put in a suitable container and 620 parts of the binder from Example 6.1 were added with stirring. The solid proportion by mass was approximately 15.8%.

EXAMPLE 7

Preparation of a Cathodic Electrodeposition Coating Dispersion a) 832 parts of a monocarbonate of an epoxy resin based on bisphenol A (®Epikote 828) were mixed with 830 parts of a commercially available polycaprolactone polyol (®CAPA 205) and 712 parts of diethylene glycol dimethyl ether, and this was reacted at 70 to 140° C. with a proportion by mass of approximately 0.3% of BF$_3$-diethyl ether complex until no more epoxy resin could be detected. 307 parts of a reaction product of 174 parts of toluylene diisocyanate (2 mol of isocyanate groups) with 137 parts of 2-ethyl hexanol with a proportion by mass of isocyanate groups of approximately 12.8%, and with the addition of a proportion by mass of 0.3% of benzyl trimethyl ammonium hydroxide (®Triton B), were added to this product (solid proportion by mass 70%, 2 mol carbonate groups) at 40 to 80° C. in the presence of a proportion by mass of 0.3% of Zn acetyl acetonate as the catalyst. Reaction was continued until no more isocyanate could be detected, and the solid proportion by mass was then adjusted to approximately 70% using diethylene glycol dimethyl ether.

b) 618 parts of a reaction product of 348 parts of toluylene diisocyanate (80% 2,4-isomer, 20% 2,6isomer) with 274 parts of 2-ethyl hexanol with a remaining proportion by mass of isocyanate groups of approximately 12.8%, and with the addition of a proportion by mass of 0.3% of benzyl trimethyl ammonium hydroxide as the catalyst were slowly added to 1759 parts of a bicarbonate of an epoxy resin based on bisphenol A (®Epikote 1001) at 60 to 80° C. Reaction was continued until no more isocyanate could be detected. 622 parts of a reaction product of 137 parts of 2-ethyl hexanol with 174 parts of toluylene diisocyanate (proportion by mass of isocyanate groups approximately 12.8%) with benzyl trimethyl ammonium hydroxide catalysis (0.3%) were added to 860 parts of bis-hexamethylene triamine dissolved in 2315 parts of methoxypropanol at a temperature of 20 to 40° C., and this was reacted until no more isocyanate could be detected. Then, 4737 parts of reaction product b) and 3246 parts of reaction product a) (each dissolved in diethylene glycol dimethyl ether, solid proportion by mass approximately 70%) were added and reacted at 60 to 90° C. The reaction was complete when there was an amine value of approximately 32 mg/g. The product obtained was concentrated to a solid proportion by mass of approximately 85% under reduced pressure.

Neutralisation was carried out with formic acid (30 mmol per 100 g of solid resin) and the product was converted to a dispersion having a solid proportion by mass of 40% using deionised water.

The effectiveness of the anti-cratering agents according to the invention was tested in a manner analogous to Example 4. Corresponding results were obtained.

What is claimed is:

1. An aqueous cathodically depositable coating composition comprising an additive comprising homopolymers or copolymers comprising 2-ethyl hexyl acrylate,
   wherein the proportion by mass of comonomers in a monomer mixture used for the preparation of the copolymers does not exceed 35%; the proportion by mass of the homopolymer or copolymer of 2-ethyl hexyl acrylate in a solid resin of the coating composition is 0.5 to 5%; and the comonomers are selected from linear, cyclic or branched alkyl acrylates having 1 to 18 carbons in the alkyl radical and linear, cyclic or branched hydroxyalkyl acrylates having 2 to 6 carbon atoms in the hydroxyalkyl radical.

2. The aqueous cathodically depositable coating composition according to claim 1, wherein the proportion by mass of the comonomers in the monomer mixture used for the preparation of the copolymer does not exceed 25%.

3. The aqueous cathodically depositable coating composition according to claim 1, wherein the proportion by mass of the homopolymer or copolymer of 2-ethyl hexyl acrylate in the solid resin of the coating is 0.9 to 1.8%.

4. The aqueous cathodically depositable coating composition according to claim 1, wherein the comonomers are selected from linear, cyclic or branched alkyl acrylates having 1 to 6 carbons in the alkyl radical.

5. The aqueous cathodically depositable coating composition according to claim 1, wherein the linear, cyclic or branched hydroxyalkyl acrylates having 2 to 4 carbon atoms in the hydroxyalkyl radical.

6. The aqueous cathodically depositable coating composition according to claim 1, wherein the homopolymer has a limiting viscosity number of 1.5 to 12 $cm^3/g$.

7. The aqueous cathodically depositable coating composition according to claim 6, wherein the homopolymer has a limiting viscosity number of 3.5 to 7 $cm^3/g$.

8. The aqueous cathodically depositable coating composition according to claim 1, wherein the homopolymers or copolymers comprising 2-ethyl hexyl acrylate are in the form of solution polymers.

9. An electro-dipcoating bath containing the aqueous cathodically depositable coating composition according to claim 1.

10. A process for preparing cathodically depositable coating compositions comprising an additive comprising homopolymers or copolymers of 2-ethyl hexyl acrylate, the process comprising adding the homopolymers or copolymers to a binder resin before the latter is emulsified in water.

11. A process for preparing cathodically depositable coating compositions comprising an additive comprising homopolymers or copolymers of 2-ethyl hexyl acrylate in the form of solution polymers, the process comprising dispersing the homopolymers or copolymers in water in the presence of an emulsifier, and then adding the dispersion to the aqueous cathodically coating composition.

12. An aqueous coating composition comprising cathodically depositable binders and a homopolymer or copolymer of 2-ethyl hexyl acrylate, the cathodically depositable binder comprising a reaction product of an epoxy resin and an amine.

13. A process for coating electrically conductive substrates comprising:
   a.) dipping a substrate in an aqueous electro-dipcoating bath which contains at least one cathodically depositable synthetic resin;
   b.) applying an electrical voltage that is greater that the deposition voltage of the synthetic resin, wherein the substrate is connected as the cathode;
   c.) depositing a film of the synthetic resin on the substrate, as a result of a flow of direct current;
   d.) removing the substrate from the bath;
   e.) optionally rinsing of the substrate; and
   f.) stoving the deposited coating film onto the substrate,
   wherein the electro-dipcoating bath contains a homopolymer or copolymer of 2-ethyl hexyl acrylate.

14. The process according to claim 13, wherein the electro-dipcoating bath contains an epoxy-amine adduct as the cathodically depositable synthetic resin.

* * * * *

UNITED STATES PATENT AND TRADEMARK OFFICE
CERTIFICATE OF CORRECTION

PATENT NO. : 6,849,169 B1
DATED : February 1, 2005
INVENTOR(S) : Helmut Hoenig, Georg Pampouchidis and Gerald Hobisch It is certified that error appears in the above-identified patent and that said Letters Patent is hereby corrected as shown below:

Column 1,
Line 18, -- ensure -- instead of "ensue"

Column 2,
Line 23, there must be an -- s -- instead of the "g"
Line 24, there must be an -- r -- instead of the "T".

Column 3,
Line 14, -- pigments, (flow -- instead of "pigments (flow"
Line 22, -- or exceeds the -- instead of "or the"
Line 59, -- 80° -- instead of "8020"

Column 5,
Line 56, -- anti-cratering -- instead of "anti ting"

Column 8,
Line 42, -- than -- instead of "that"

Signed and Sealed this

Tenth Day of May, 2005

JON W. DUDAS
*Director of the United States Patent and Trademark Office*